United States Patent
Yuan et al.

(10) Patent No.: US 10,282,912 B1
(45) Date of Patent: May 7, 2019

(54) SYSTEMS AND METHODS TO PROVIDE AN INTERACTIVE SPACE OVER AN EXPANDED FIELD-OF-VIEW WITH FOCAL DISTANCE TUNING

(71) Applicant: Meta Company, San Mateo, CA (US)

(72) Inventors: Sheng Yuan, San Jose, CA (US); Ashish Ahuja, Mountain View, CA (US); Jie Xiang, Mountain View, CA (US); Hui Li, Belmont, CA (US)

(73) Assignee: Meta View, Inc., San Mateo, CA (US)

( * ) Notice: Subject to any disclaimer, the term of this patent is extended or adjusted under 35 U.S.C. 154(b) by 0 days.

(21) Appl. No.: 15/607,033

(22) Filed: May 26, 2017

(51) Int. Cl.
  *G06T 19/00* (2011.01)
  *G09G 3/02* (2006.01)
  *G02B 27/01* (2006.01)

(52) U.S. Cl.
  CPC ........ *G06T 19/006* (2013.01); *G02B 27/0172* (2013.01); *G09G 3/02* (2013.01); *G02B 2027/014* (2013.01); *G02B 2027/0123* (2013.01); *G09G 2340/0407* (2013.01)

(58) Field of Classification Search
  CPC .......... G06K 9/00664–9/00704; G06F 3/0481; G06F 3/04817; G06F 9/4443; G06F 3/04847; G06F 11/3664; G06F 3/012; G06F 3/0304; G06F 3/011–3/015; G06T 19/00; G06T 17/00; G06T 19/006; G06T 2215/16; H04N 5/272; H04N 2201/3245; A63F 13/10
  See application file for complete search history.

(56) References Cited

U.S. PATENT DOCUMENTS

| | | |
|---|---|---|
| 9,541,757 B2 | 1/2017 | Yokoyama |
| 2002/0181115 A1 | 12/2002 | Massof |
| 2007/0188837 A1 | 8/2007 | Shimizu |
| 2009/0128922 A1* | 5/2009 | Justis ................ G02B 3/14 359/666 |
| 2011/0075257 A1 | 3/2011 | Hua |
| 2012/0033853 A1 | 2/2012 | Kaneda |

(Continued)

FOREIGN PATENT DOCUMENTS

DE 102014013320 3/2016

OTHER PUBLICATIONS

Final Office Action, U.S. Appl. No. 14/852,573, dated Nov. 28, 2017 (10 pages).

(Continued)

*Primary Examiner* — Todd Buttram

(57) ABSTRACT

Systems and methods to provide an interactive space over an expanded field-of-view with focal distance tuning are presented herein. The system may include one or more of a headset, a first image forming component, a second image forming component, a set of tuning components, one or more physical processors, and/or other components. The first image forming component may be configured to generate light rays to form a first set of images presented over a first angular portion of a user's field-of-view. The second image forming component may be configured to generate light rays to form a second set of images of virtual content presented over a second angular portion of the user's field-of-view. A vergence distance of a gaze of a user may be determined. A focal distance of the images may be adjusted to match the vergence distance.

18 Claims, 9 Drawing Sheets

(56) References Cited

U.S. PATENT DOCUMENTS

| | | |
|---|---|---|
| 2012/0056896 A1 | 3/2012 | Border |
| 2014/0043227 A1 | 2/2014 | Skogoe |
| 2014/0204438 A1 | 7/2014 | Yamada |
| 2015/0049120 A1 | 2/2015 | He |
| 2015/0332506 A1 | 11/2015 | Aratani |
| 2016/0026253 A1 | 1/2016 | Bradski |
| 2016/0077336 A1 | 3/2016 | Hainich |
| 2016/0116745 A1* | 4/2016 | Osterhout ........... G06F 3/03547 359/614 |
| 2016/0131903 A1 | 5/2016 | Kollin |
| 2016/0187661 A1 | 6/2016 | Yajima |
| 2016/0370855 A1* | 12/2016 | Lanier .................... H04N 5/335 |
| 2017/0109562 A1 | 4/2017 | Shroff |
| 2017/0184848 A1* | 6/2017 | Vallius ..................... G02B 3/14 |
| 2017/0235143 A1 | 8/2017 | Chi |
| 2017/0315367 A1 | 11/2017 | Maruyama |

OTHER PUBLICATIONS

Notice of Appeal From the Examiner to the Board of Patent Appeals and Interferences, U.S. Appl. No. 14/852,573, dated Jan. 30, 2018 (2 pages).

Draft Appeal Brief Under 37 CFR 41.31(a)(1), U.S. Appl. No. 14/852,573, dated Jan. 30, 2018 (27 pages).

* cited by examiner

SYSTEMS AND METHODS TO PROVIDE AN INTERACTIVE SPACE OVER AN EXPANDED FIELD-OF-VIEW WITH FOCAL DISTANCE TUNING

FIELD OF THE INVENTION

The systems and methods described herein relate to providing an interactive space, such as an augmented reality environment and/or a virtual reality environment, over an expanded field-of-view and further including a feature of focal distance tuning.

BACKGROUND OF THE INVENTION

There are many types of vision systems that provide virtual and/or augmented reality (AR) displays. In particular, wearable technology such as head mounted displays (HMD) are becoming more popular. Currently, some AR displays have a limited field-of-view, resulting in a less immersive interactive experience for the user.

SUMMARY

One or more implementations of the systems and methods described herein may be configured to provide an interactive space over an expanded field-of-view with focal distance tuning. Vergence movements of the eye may be closely connected to accommodation of the eye. Vergence may refer to the simultaneous movement of both eyes in opposite directions, and/or the movement of one eye in relation to the other, to obtain and/or maintain single binocular vision. Accommodation may refer to the process by which the vertebrate eye changes optical power to maintain a clear image or focus on an object as its distance varies. This may include the automatic adjustment of the eye for seeing at different distances effected by changes in the convexity of the crystalline lens. In some stereoscopic display devices and systems, such as those presented herein, an image presented to a user may be focused at a fixed focal distance (or depth) away from the eye, while the perceived distance (or depth) of the virtual content formed by the images may vary. The differences in those distances may require the viewer to uncouple vergence and accommodation. The uncoupling of vergence and accommodation required by stereoscopic displays may reduce one's ability to fuse the binocular stimulus and may cause discomfort and/or fatigue for the viewer. This problem may be referred to as the "vergence-accommodation conflict." One or more implementations of the system presented herein may be configured to solve this problem and/or other problems. By way of non-limiting illustration, a set of tuning components may be configured to adjust (e.g., tune) the focal distance of images forming virtual content to match, or substantially match, the vergence distance, therefore increasing the ease of use and comfort of an optical system.

An interactive space may include one or both of a virtual reality environment and/or an augmented reality environment. An augmented reality environment may include views of images of virtual content superimposed over views of a real-world environment. A virtual reality environment may include views of images of virtual content within a virtual environment.

Views of virtual content may be presented to a user in one or both of the user's central field-of-view and/or peripheral field-of-view. The central field-of-view may refer to an angular range of a user's field-of-view when the user is looking forward. The central field-of-view may include one or more of central vision, paracentral vision, near-peripheral vision, and/or other areas and/or ranges within a user's field-of-view. The peripheral field-of-view may refer to an angular range of a user's field-of-view when the user is looking forward. The peripheral field-of-view may include one or more of near-peripheral vision, mid-peripheral vision, far peripheral vision, and/or other areas and/or ranges within a user's field-of-view. It is noted that "field-of-view" may refer generally to a horizontal field-of-view in one or both of monocular and/or binocular vision. It is further noted that the term "horizontal" may refer to a reference line or plane that may be orthogonal to a user's head position and/or orthogonal to a local gravity vector.

A system configured to provide an interactive space over an expanded field of view with focal distance tuning may include one or more of a headset, one or more physical processors, one or more image forming components, one or more tuning components, a gaze tracking device, a depth sensor, and/or other components.

In some implementations, one or more of the one or more physical processors, one or more image forming components, one or more tuning components, the gaze tracking device, the depth sensor, and/or other components may be included in the headset. The headset may be configured to be installed (e.g., worn) on a head of a user. By way of non-limiting illustration, headset may include one or more of a head-mounted display (HMD), glasses, and/or other devices.

In some implementations, one or more components of the system may be included in one or more external devices, such as one or more of a desktop computer, a laptop computer, a mobile computer, and/or other devices. By way of non-limiting illustration, the one or more physical processors and/or other components may be included in a mobile device external to the headset. The headset may be tethered and/or otherwise connected to the one or more external devices. Such connection may be wired (e.g., USB and/or other wired connection) and/or wireless (e.g., Bluetooth, Wi-Fi, and/or other wireless connection).

In some implementations, a first image forming component and a second image forming component may be used for presenting images to a single eye of the user (e.g., monocular vision). The first image forming component may be configured to generate light rays to form a first set of images of virtual content at a first resolution. The first image forming component may be configured such that when the headset is installed on the head of the user, the first set of images may be presented to the user over a first angular portion of the user's field-of-view. The first image forming component may be configured such that the first set of images may be superimposed over a view of the real world to create at least part of the interactive space. The first image forming component may be configured such that the first set of images may be focused at a focal distance away from the user.

In some implementations, the second image forming component may be configured to generate light rays to form a second set of images of virtual content at a second resolution. The second image forming component being configured such that when the headset is installed on the head of the user, the second set of images may be presented to the user over a second angular portion of the user's field-of-view. The second angular portion may be different from the first angular portion. The second image forming component may be configured such that the second set of images may be superimposed over the view of the real world to create at least a second part of the interactive space. The second image forming component being configured such that the second set of images may be focused at the focal distance away from the user.

In some implementations, a gaze tracking device held by the headset may be configured to generate output signals conveying positions of one or more pupils of the user.

In some implementations, the depth sensor may be configured to generate output signals conveying distance of real-world objects and/or surfaces from the depth sensor. By way of non-limiting illustration, depth sensor may generate output signals conveying a relative distance of a user's hands and/or at what depth the user may be interacting with virtual content.

In some implementations, a set of tuning components held by the headset configured to adjust the focal distance may be incorporated.

The one or more physical processor may be configured by machine-readable instructions. The machine-readable instructions may include one or more of a control component, a gaze tracking component, a depth sensing component, and/or other components.

In some implementations, the control component may be configured to control the first image forming component to generate the light rays to form the first set of images of virtual content.

In some implementations, the control component may be configured to control the second image forming component to generate the light rays to form the second set of images of virtual content.

In some implementations, the gaze tracking component may be configured to determine a vergence distance of a gaze of the user over time based on the output signals of the gaze tracking device.

In some implementations, the depth sensing component may be configured to determine, based on output signals from the depth sensor, a distance of a user's hands and/or at what depth the user may be interacting with virtual content, referred to as "depth information." The focal distance of the tunable optic may be tuned to this depth (e.g., via control component).

In some implementations, the control component may be configured to control the set of tuning components to adjust the focal distance to match a current vergence distance of the user and/or to match depth the user may be interacting with virtual content (e.g., via depth information).

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of any limits. As used in the specification and in the claims, the singular form of "a", "an", and "the" include plural referents unless the context clearly dictates otherwise.

DETAILED DESCRIPTION

Figure 1:
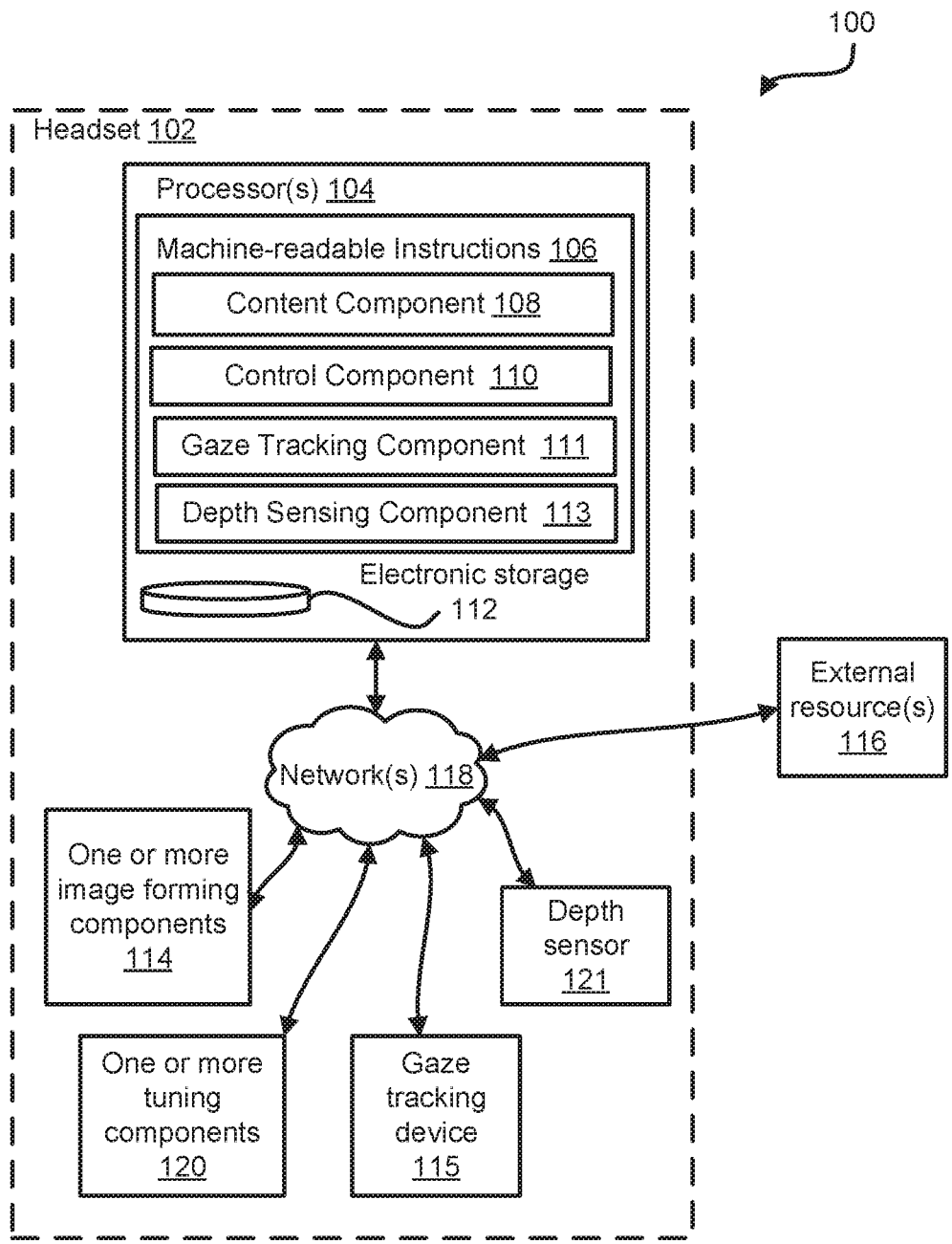
FIG. 1 illustrates a system configured to provide an interactive space over an expanded field-of-view with focal distance tuning, in accordance with one or more implementations.

FIG. 1 shows a system 100 configured to provide an interactive space over an expanded field-of-view with focal distance tuning, in accordance with one or more implementations. One or more tuning components may be included to facilitate adjusting (e.g., tuning) a focal distance of virtual content presented to a user. An interactive space may include one or both of an augmented reality environment and/or a virtual reality environment. An augmented reality environment may include views of the images of virtual content superimposed over the views of the real-world. A virtual reality environment may include views of virtual content within a virtual environment. The terms "space" and "environment" may be used interchangeably herein.

The human perceptual system can combine various sensory cues in an efficient manner in order to perceive "physically plausible" virtual content in a real-world environment. For example, the human perceptual system can integrate, among other things, sensory cues such as one or more of luminance, depth, and/or shape information to form or perceive coherent virtual content. Virtual content may include one or more virtual objects, and/or other content. As a result, the properties of the human perception may be exploited through visual systems, as described herein, employing hardware and/or software architectures to form virtual content (e.g., digital images) that may be located and/or perceived to be located in the real-world environment by virtue of neuroscience principles.

Vergence movements of the eye may be closely connected to accommodation of the eye. Vergence may refer to the simultaneous movement of both eyes in opposite directions to obtain and/or maintain single binocular vision. Accommodation may refer to the process by which the vertebrate eye changes optical power to maintain a clear image or focus on an object as its distance varies. While viewing real-world objects in a real-world environment, changing the focus of the eyes to look at real-world objects at different distances may automatically be coupled to a change in vergence. In some stereoscopic display devices and systems, an image presented to a user may be focused at a fixed focal distance (or depth) away from the eye, while the perceived distance (or depth) of the virtual content formed by the images may vary. The differences in those distances may require the viewer to uncouple vergence and accommodation. The uncoupling of vergence and accommodation required by stereoscopic displays may reduce one's ability to fuse the binocular stimulus and may cause discomfort and/or fatigue for the viewer. This problem may be referred to as the "vergence-accommodation conflict." One or more implementations of system 100 presented herein may be configured to solve this problem and/or other problems.

The system 100 presented herein may include techniques in which images of virtual content forming part of an interactive space may be presented over an angular portion of a user's field-of-view corresponding to a central field-of-view. Other images of virtual content forming another part of the interactive space may be presented over an angular portion of a user's field-of-view corresponding to a peripheral field-of-view. Such configurations may facilitate expanding the field-of-view over which content may be viewable by the user.

The central field-of-view may refer to an angular range of a user's field-of-view when the user is looking forward. The central field-of-view may include one or more of central vision, paracentral vision, near-peripheral vision, and/or other areas and/or ranges within a user's field-of-view.

The peripheral field-of-view may refer to an angular range of a user's field-of-view when the user is looking forward. The peripheral field-of-view may include one or more of near-peripheral vision, mid-peripheral vision, far peripheral vision, and/or other areas and/or ranges within a user's field-of-view.

It is noted that "field-of-view" may refer generally to a horizontal field-of-view in one or both of monocular or binocular vision. It is further noted that the term "horizontal" may refer to a reference line or plane that may be orthogonal to a user's head position and/or orthogonal to a local gravity vector.

Human vision within the peripheral field-of-view is significantly worse than in the central field-of-view in many ways. Poorer spatial resolution in the periphery is largely due to a decreased cone photoreceptor density. Accordingly, human vision may not appreciate detail or depth within the peripheral field-of-view. To exploit this, in some implementations the images forming virtual content presented at the angular portion corresponding to central field-of-view may be generated at a higher resolution relative the images forming virtual content presented at the angular portion corresponding to peripheral field-of-view. In some implementations, a user may shift their gaze such the user may not be looking straight forward (e.g., look to the left or right). The user's gaze may then be directed at portions of the field-of-view that would otherwise be within their peripheral field-of-view if the user was still looking straight forward. In such implementations, the second resolution may be adjusted to be the same as or similar to the first resolution.

Referring to FIG. 1, system 100 may include one or more of a headset 102, one or more physical processors 104, one or more image forming components 114, a gaze tracking device 115, one or more tuning components 120, a depth sensor 121, and/or other components.

In some implementations, virtual content formed by images generated by one or more image forming components 114 of system 100 may be rendered to be perceived at a given distance from the user. A stereoscopic image pair spacing and/or disparity of the images presented independently to each eye may be specified. The specification of the image pair spacing and/or disparity may correspond to known and/or predictable features for one or more of a vergence angle, vergence distance, and/or other aspect of the user's vision when viewing the virtual content. The vergence angle may refer to an angle between lines of sight extending from individual ones of a user's pupils. The vergence distance may refer to the distance between the eye and a point in space where the lines of sight from both of the user's eye intersect. The vergence distance may be at a range that may be the same as, or similar to, a perceived range of virtual content the user may be viewing.

In some implementations, one or more image forming components 114 generating images forming the virtual content may be configured such that a focal distance of the images presented to a user may be fixed. The focal distance may not be the same as the vergence distance. This disparity may cause the aforementioned vergence-accommodation conflict. Further, the vergence distance may change as the user shifts their gaze to different virtual content presented within their field of view. Accordingly, in some implementations, one or more tuning components 120 may be implemented to adjust (e.g., tune) the focal distance to match, or substantially match, the vergence distance (e.g., specified by the stereoscopic image pair spacing and/or disparity and/or determined by tracking the user's gaze). Tuning the focal distance to match, or substantially match, the vergence distance may reduce and/or eliminate the vergence-accommodation conflict.

In some implementations, one or more components of system 100 may be included with and/or otherwise held by headset 102. The headset 102 may be configured to be installed (e.g., worn) on a head of a user. By way of non-limiting illustration, headset 102 may include one or more of a head-mounted display (HMD) (see, e.g., FIG. 14), glasses, and/or other devices.

In some implementations, one or more components of system 100 may be included in one or more devices external to headset 102. For example, one or more components may be included in one or more of a desktop computer, a laptop computer, other mobile computer configurations, and/or other devices. By way of non-limiting illustration, one or more physical processors 104 and/or other components may be included in a mobile computing device external to headset 102. The headset 102 may be tethered and/or otherwise connected to one or more external devices. Such connection may be wired (e.g., USB and/or other wired connection) and/or wireless (e.g., Bluetooth, Wi-Fi, and/or other wireless connection).

Figure 14:
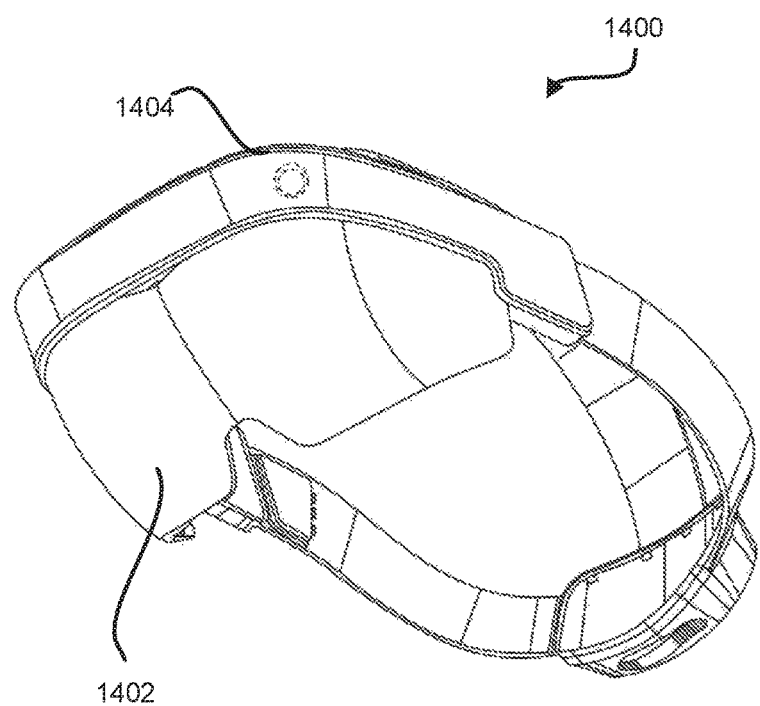
FIG. 14 illustrates an exemplary head-mounted display.

Referring now to FIG. 14, in some implementations, a headset (e.g., headset 102 in FIG. 1) may comprise an HMD 1400. One or more components of system 100 (FIG. 1) may be held by and/or comprise part of HMD 1400. By way of non-limiting illustration, one or more optical elements of individual image forming components may comprise at least part of a visor portion 1402 of an HMD 1400. One or more of one or more physical processors, one or more image forming components, one or more tuning components, a gaze tracking device, and/or other components may be incorporated into a housing portion 1404 and/or other portions of HMD 1400.

Returning to FIG. 1, individual image forming components of one or more image forming components 114 may be configured to generate light rays to form images of virtual content at one or more resolutions. Virtual content may be perceived within a three-dimensional light field within a viewing user's field-of-view. Virtual content may be focused at one or more focal planes within the three-dimensional light field. A focal plane may be positioned at a given range from the user's eye. The range of a focal plane may be referred to as a focal distance or focal range. The focal distance may effect an accommodation of the user's eye.

Individual ones of one or more image forming components 114 may include one or more of one or more light sources, one or more optical elements, and/or other components. In some implementations, an individual light source may be arranged on a headset to direct light rays toward one or more optical elements. The one or more image forming components 114 may be configured such that images of virtual content may be superimposed over a view of the real world to create an interactive space. In some implementations, images may be presented individually to each eye of the user as stereo image pairs.

A light source may comprise one or more of a microelectromechanical systems (MEMS) RGB laser scanner, a microLED microdisplay, an LED illuminated liquid crystal on silicon (LCOS) microdisplay, an RGB laser LCOS microdisplay, a digital light projector (DLP), a digital micromirror device (DMD), a liquid crystal display (LCD), an organic light-emitting diode (OLED) display, an OLED microdisplay, and/or other light sources.

It is noted that the use of the term "light ray" is not intended to limit the scope of the disclosure to single, discrete, photons and/or packets of photons. Instead, the disclosure may envision a light ray to mean a light beam comprising multiple and continuous photons, in one or more implementations.

In some implementations, one or more optical elements may be arranged on a headset such that, when the headset is installed on the head of a user, the user's gaze may be directed toward the one or more optical elements. In some implementations, an optical element may form at least part of a portion of headset 102 through which a user may view the real-world. In some implementations, an optical element may comprise one or more reflective and/or partially reflective surfaces. An optical element may be formed from a reflective and/or partially reflective material. An optical element may be formed from a transparent and/or partially transparent material. A material of an optical element may comprise one or more of ZEONEX, Cyclo Olefin Polymer (COP), Cyclic Olefin Copolymer (COC), polycarbonate, Poly (methyl methacrylate) (PMMA), and/or other materials.

In some implementations, an optical element may comprise one or more of a waveguide, optical coupling features, and/or other components. A waveguide may include one or more of a layered waveguide, a planar partial mirror array waveguide, a diffractive waveguide, a diffractive waveguide including Bragg gratings, a free form surface prism, and/or other waveguides. In some implementations, a waveguide may include and/or may be coupled with optical coupling features configured to couple light rays into the waveguide. Light rays coupled into a waveguide may be propagated through the waveguide and directed out of the waveguide toward one or more eyes of a user.

In some implementations, an optical element may comprise a planar partial mirror array waveguide and/or other components. The light rays from a light source may be coupled into the waveguide at an entrance of the waveguide, and propagated to a partial mirror array region of the waveguide by total internal reflection. The light rays may be reflected by the partial mirror array and directed toward the user's eye.

In some implementations, one or more optical elements may be arranged on a headset such that, when the headset is installed on the head of the user, light rays generated by one or more light sources may be directed onto the one or more optical elements to form images of virtual content on the one or more optical elements. The images of virtual content on the one or more optical elements may be superimposed over the user's view of the real world through the one or more optical elements to create an interactive space.

In some implementations, one or more optical elements may be arranged on a headset such that light rays generated by one or more light sources may be directed at the one or more optical elements, coupled into the one or more optical elements, and directed out of the one or more optical element into an eye of a user. The images of virtual content may be projected onto a retina of an eye such that the images may be superimposed over the user's view of the real world.

The gaze tracking device 115 may be configured to generate information for tracking a user's gaze. Tracking a user's gaze may be based on the line of sight extending from individual pupils and/or other information. The gaze tracking device 115 may include one or more of a sensor, an emitter, and/or other components. The emitter may be configured to emit light. The emitter may comprise an infrared (IR) emitter configured to emit IR light. In some implementations, a sensor may comprise one or more of an IR sensor, an image sensor, and/or other sensors. A sensor may be incorporated into a camera and/or other devices. By way of non-limiting illustration, a sensor of gaze tracking device 115 may comprise an IR camera and/or other devices. In some implementations, output signals of one or more sensors of gaze tracking device 115 may convey one or more of positions of pupils of a user relative to a locus of a reflectance of light emitted by an emitter of gaze tracking device 115, and/or other information. Output signals of one or more sensors of gaze tracking device 115 may be used to determine gaze information. Gaze information may include one or more of a gaze direction, vergence angle, vergence distance, and/or other information related to a user's vision (see, e.g., gaze tracking component 111 shown in FIG. 1 and described herein). In some implementations, gaze direction may indicate whether the user is looking straight ahead into the central field-of-view, looking to the left and/or right into the peripheral field-of-view, and/or looking up and/or down.

In some implementations, depth sensor 121 may be configured to generate output signals conveying distance of real-world objects and/or surfaces from depth sensor 121. By way of non-limiting illustration, depth sensor 121 may generate output signals conveying a distance of a user's hands and/or at what depth the user may be interacting with virtual content. The depth sensor 121 may comprise one or more of a time-of-flight sensor, a structured light sensor, an unstructured light sensor, an active stereo pair, a passive stereo pair, and/or other depth sensing devices.

Figure 2:
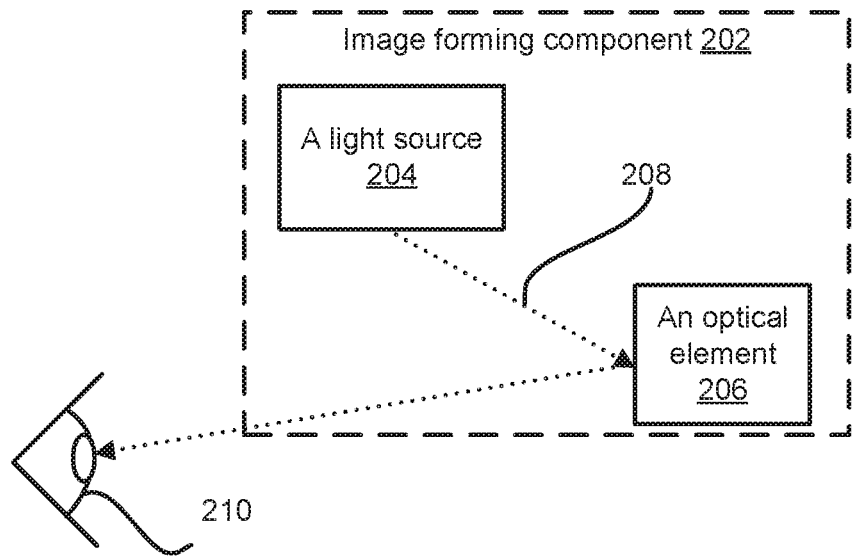
FIG. 2 illustrates a configuration of an image forming component comprising a light source and an optical element.

FIG. 2 illustrates an implementation of an image forming component 202. The image forming component 202 may include one or more of a light source 204, an optical element 206, and/or other components. The light source 204 may be configured to emit light rays forming images, including light ray 208. The optical element 206 may be configured to receive the light rays generated by light source 206. The optical element 206 may be configured to provide the light rays to an eye 210 to present the images over an angular portion of a user's field-of-view. Light rays from an ambient environment may pass through optical element 206 and reach eye 210.

Figure 3:
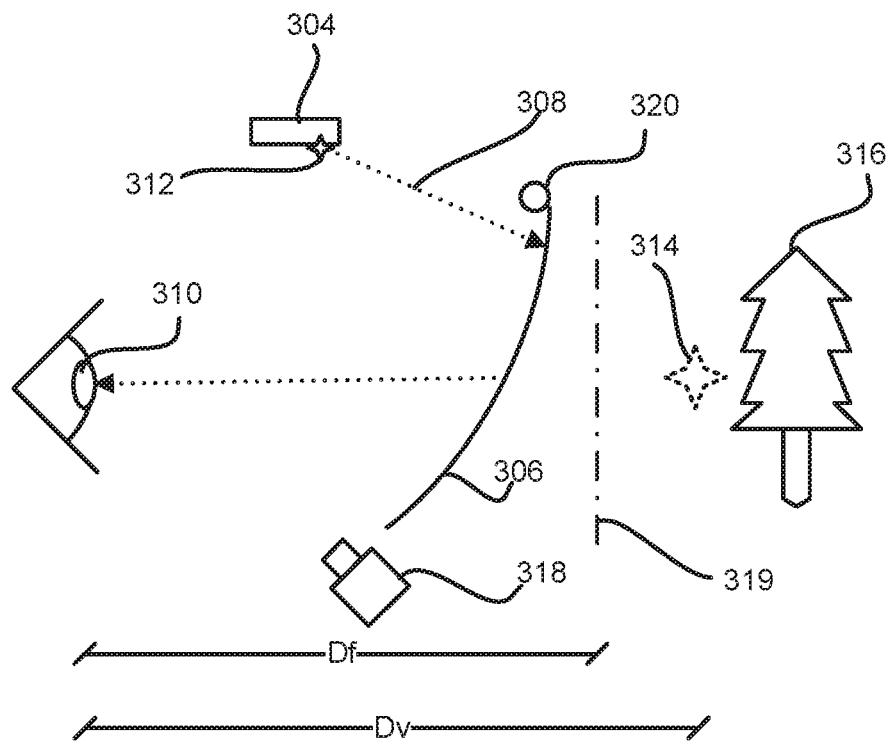
FIG. 3 illustrates a configuration of an image forming component configured to generate images forming virtual content.

FIG. 3 illustrates a configuration of a light source 304 and an optical element 306 of an image forming component, and an emitter 320 and sensor 318 of a gaze tracking device, in accordance with one or more implementations. The optical element 306 may comprise, and/or may be part of, a visor portion of a headset, such as an HMD. The light source 304 may be configured to emit light rays, including light ray 308. The light rays may form images, including image 312. The light rays may be received by optical element 306 and provided to an eye 310 of a user. The light rays received by eye 310 may form virtual content 314 (e.g., a virtual object) perceived to lie within three-dimensional space in the user's field of view. The virtual content 314 may be superimposed over the user's view of real-world objects, including real-world object 316.

FIG. 3 further provides a visual illustration of the vergence-accommodation conflict as presented herein. If it is desired to render virtual content 314 at given distance from eye 310, the vergence distance, Dv, of the user's vision system may be defined to match the intended distance of the object from the user (in this case, also Dv), e.g., by setting a stereoscopic image pair spacing or disparity. The vergence-accommodation conflict may arise in that a focal plane 319 may be at a focal distance, Df, which may be fixed and different from the vergence distance, Dv. By tuning the focal distance, Df, and/or by tracking exactly where the user's gaze may be converging (which may change Dv), the focal distance, Df, of focal plane 319 may be moved to match the vergence distance, Dv.

The implementation of a single image forming component to provide light rays to an eye of a user as shown in FIG. 2 may be limited in the field of view over which virtual content may be presented. One or more implementations of system 100 presented herein may utilize a set of image forming components to provide images to individual eyes. Individual image forming components in a set of image forming component may be configured to direct light rays over a specified angular portion of a user's field of view. For example, utilizing at least two image forming components per eye may facilitate providing a first set of light rays over a first angular portion of the user's field of view corresponding to central vision and a second set of light rays over a second angular portion of the user's field of view corresponding to peripheral vision. In some implementations, another technique to expand the field-of-view may comprise utilizing a transparent display, and positioning the transparent display close to the eye, similar to sunglasses.

In some implementations, the first angular portion may not overlap with the second angular portion. The first angular portion may correspond to a central field-of-view within the user's monocular field-of-view from a given eye. The second angular portion may correspond to a peripheral field-of-view within the user's monocular field-of-view from the given eye. The first angular portion may be centered along the user's line of sight from the given eye (e.g., when the user is looking straight ahead). By way of non-limiting illustration, the first angular portion may correspond to one or more of a 50 degree range, a 60 degree range, a 70 degree range, and/or other ranges in the user's field-of-view.

The second angular portion may be adjacent to the first angular portion. The second angular portion may correspond to one or more of a 20 degree range, a 30 degree range, a 40 degree range, and/or other ranges in the user's field-of-view. In some implementations, the second angular portion may refer to an angular range positioned at the temporal side of the user's visual field (e.g., as opposed to the nasal side). In some implementations, adjacent may mean that the first angular portion and second angular portion may be positioned laterally with respect to each other within the user's field-of-view. In some implementations, the first angular portion and second angular portion may be positioned laterally within the user's field-of-view insofar that a terminating edge of the first angular portion may abut a terminating edge of the second angular portion. The first angular portion may be contiguous with the second angular portion.

In some implementations, the first angular portion may overlap with the second angular portion. The overlap may be slight and/or imperceptible by the user. The first angular portion may overlap the second angular portion by a 1-3 degree range over the user's field-of-view. The first angular portion may overlap the second angular portion by less than 10% of the viewing range associated with the first angular portion. The first angular portion may overlap the second angular portion by less than 5% of the viewing range associated with the first angular portion. The first angular portion may overlap the second angular portion by less than 1% of the viewing range associated with the first angular portion.

Returning to FIG. 1, in conjunction with the utilization of multiple image forming components to expand the field of view over which virtual content may be presented, one or more implementations of system 100 may further utilize one or more tuning components 120 to solve the aforementioned vergence-accommodation conflict.

Individual tuning components may be arranged on either a user-side of an optical element and/or an environment-side of an optical element. The user-side may refer to a side of an optical element that may be adjacent to the user when installed on the head of the user. For example, the user-side may refer to a part of an optical path of a light ray passing through the optical element that may have already encountered the optical element (e.g., via reflection and/or propagating through the optical element). The environment-side may refer to a side of an optical element that may be adjacent to the ambient environment of the user when installed on the head of the user. For example, the environment-side may refer to a part of an optical path that is in the ambient environment prior to encountering the optical element.

In some implementations, an individual tuning component of one or more tuning components 120 may include one or more of a positive tunable lens, a negative tunable lens, a polarizing tunable lens, an absorptive polarizer, and/or other components.

The positive and/or negative tunable lenses may be electrically addressed. Based on an applied voltage/current, an optical power of the positive and/or negative tunable lenses may be controlled. A positive and/or negative tunable lens may comprise one or more of a liquid crystal tunable lens, an electroactive polymer membrane based tunable lens, an electro-wetting based tunable lens, and/or other lenses.

A polarizing tunable lens may be configured to focus light beams with certain polarization state, while other polarized light may pass through without any optical power. A polarizing tunable lens may comprise a liquid crystal polarizing tunable lens, and/or other lenses. The polarizing tunable lens may be electrically addressed. Based on an applied voltage/current, an optical power of the polarizing tunable lens may be controlled.

An absorptive polarizer may have a high extinction ratio (e.g., greater than 500:1, and/or other rations) and high polarization-transmittance (e.g., overall transmittance for un-polarized light may be larger than 42% and/or other percentages) with broadband wavelength (e.g., 400-760 nm and/or other wavelengths). The absorptive polarizer may be laminated, deposited, and/or self-assembled onto a surface (e.g., a surface of a visor).

In some implementations, tuning components may be used in pairs. For example, a positive tunable lens may be used with a negative tunable lens; and a polarizing tunable lens may be used with an absorptive polarizer.

Tuning components may be implemented in conjunction with optical elements of the image forming components. For a set of image forming components utilized for presenting images over an expanded field of view (e.g., a central field of view and peripheral field of view), a set of tuning components may be used for at least the optical element included in the image forming component configured to present images in the central field of view, as this is the region that has the most sensitivity to depth. In some implementations, for a set of image forming components utilized for presenting images over an expanded field of view (e.g., a central field of view and peripheral field of view), a set of tuning components may be used for all optical elements included in set of image forming components. Various configurations of tuning components and optical elements are shown in FIGS. 4-13 and described herein.

Figure 4:
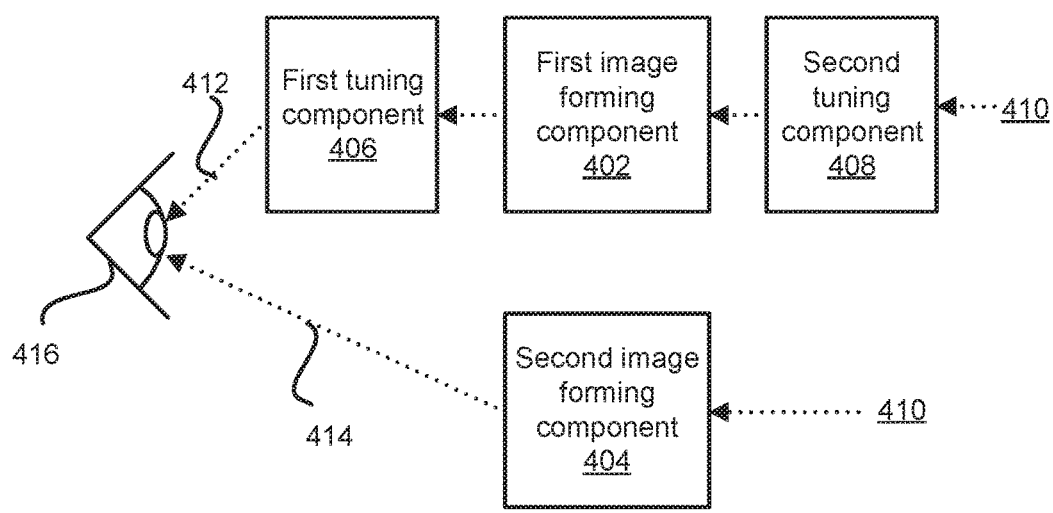
FIG. 4 illustrates a configuration of image forming components and tuning components, in accordance with one or more implementations.

FIG. 4 illustrates a configuration of image forming components and tuning components. The image forming components and tuning components may be held by a headset (not shown in FIG. 4). The image forming components may include one or more of a first image forming component 402, a second image forming component 404, and/or other image forming components. The tuning components may include one or more of a first tuning component 406, a second tuning component 408, and/or other tuning components. The second tuning component 408 may be configured to negate the effects of distortion on the real world by first image forming component 406.

The first image forming component 402 may be configured to generate light rays to form a first set of images of virtual content at a first resolution. The first image forming component 402 may be configured such that when the headset is installed on the head of the user, the first set of images may be presented to the user over a first angular portion of the user's field-of-view. The first angular portion may correspond to central field of view. The first set of images may be superimposed over a view of the real world to create at least part of an interactive space. The first set of images may be focused at a focal distance away from the user.

The second image forming component 404 may be configured to generate light rays to form a second set of images of virtual content at a second resolution. The second resolution may be less than the first resolution. The second image forming component 404 may be configured such that when the headset is installed on the head of the user, the second set of images may be presented to the user over a second angular portion of the user's field-of-view. The second angular portion may correspond to peripheral field of view. The second set of images may be superimposed over a view of the real world to create at least part of the interactive space. The second set of images may be focused at a focal distance away from the user. The focal distance of the second set of images may be the same as or similar to the focal distance of the first set of images.

The first tuning component 406 may be positioned on a user-side of first image forming component 402 (e.g., user-side of an optical element included in first image forming component 402). The second tuning component 408 may be positioned on the environment-side of first image forming component 402 (e.g., environment-side of an optical element included in second image forming component 404). The position of first tuning component 406 and/or second tuning component 408 with respect to first image forming component 402 may mean first tuning component 406 and/or second tuning component 408 form an optical path with an optical element included in first image forming component 402. The optical path may include a path where light rays from an ambient environment 410 pass through second tuning component 408, then pass through an optical element of first image forming component 402 where they combine with light rays provided to the optical element by a light source (not shown in FIG. 4). The combined light rays may pass through first tuning component 406 forming light rays 412 that encounter eye 416. In this way the focal distance of the image created from first image forming component 402 may only be modulated by first tuning component 406. Light rays from ambient environment 410 may pass through second image forming component 404, combining with light rays generated by second image forming component 404, forming light rays 414 that encounter eye 416. A mirrored configuration of the components shown in FIG. 4 may be used for a second eye of the user. Other sets of images may be presented over angular portions of the second eye of the user that may comprise stereo image counterparts of the first set of images and second set of images to create a stereoscopic effect when viewed by both eyes of the user.

In some implementations, first tuning component 406 may be a negative tunable lens; and second tuning component 408 may be a positive tunable lens. Light rays emitted by a light source of first image forming component 402 and provided to an optical element may focus the light rays toward the user's eye through first tuning component 406. The negative tunable lens of first tuning component 406 may be electrically controllable in order to change the focal distance of the virtual content formed by the light rays. In order not to distort the see-through real world (e.g., light rays from ambient environment 410), the positive tunable lens of second tuning component 408 may be used to compensate the distortion of the real world due to the negative tunable lens of first tuning component 406.

In some implementations, first tuning component 406 may be a polarizing tunable lens; and second tuning component 408 may be an absorptive polarizer. The polarizing tunable lens of first tuning component 406 may focus light of certain polarization, and may allow passage of light of other polarization without distortion. Light rays emitted by a light source of first image forming component 402 and provided to an optical element may be polarized along x-axis, which may then be focused toward the user's eye 416 through the polarizing lens of first tuning component 406. The polarizing lens of first tuning component 406 may be electrically controllable in order to change the focal distance of virtual content formed by the light rays. The light rays from the ambient environment 410 may be un-polarized. When real world light propagates through the absorptive polarizer of second tuning component 408 on the environment-side of first image forming component 402, a component (e.g., the x-component) of the light may be absorbed, and only an other component (e.g., the y-component) of the light may pass through first image forming component 402 and the polarizing tunable lens of first tuning component 406.

In some implementations, the first resolution of the first set of images presented over the first angular portion may be higher than the second resolution of the second set of images presented over the second angular portion. In some implementations, high resolution may mean the image resolution may be higher than 30 pixels per degree, for example, 60 pixels per degree and/or other resolutions. In some implementations, low resolution may mean the image resolution may be lower than 30 pixels per degree, for example, 20 pixels per degree and/or other resolution.

Figure 5:
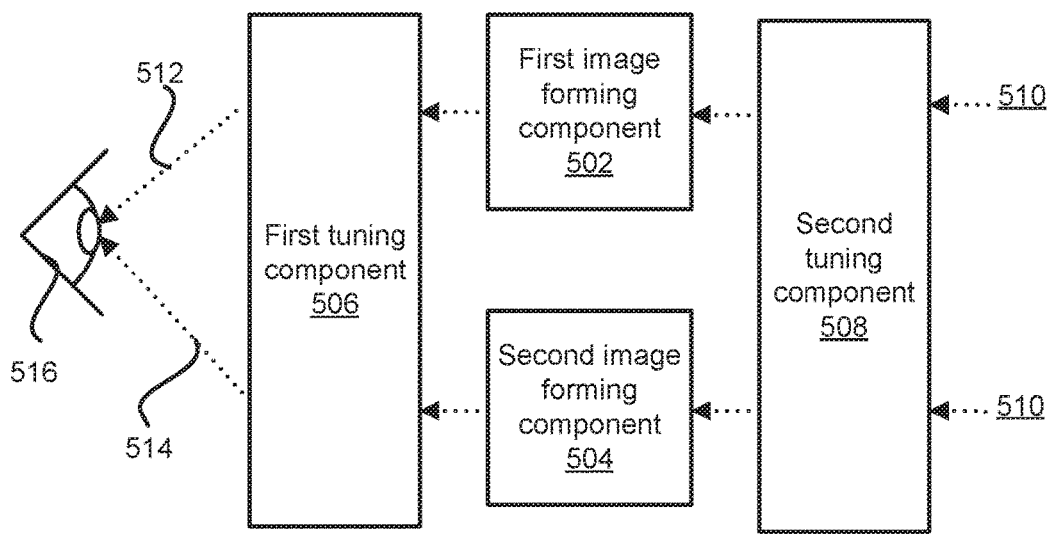
FIG. 5 illustrates a configuration of image forming components and tuning components, in accordance with one or more implementations.

FIG. 5 illustrates a configuration of image forming components and tuning components. The image forming components and tuning components may be held by a headset (not shown in FIG. 5). The image forming components may include one or more of a first image forming component 502, a second image forming component 504, and/or other image forming components. The tuning components may include one or more of a first tuning component 506, a second tuning component 508, and/or other tuning components.

The first image forming component 502 may be configured to generate light rays to form a first set of images of virtual content at a first resolution. The first image forming component 502 may be configured such that when the headset is installed on the head of the user, the first set of images may be presented to the user over a first angular portion of the user's field-of-view. The first angular portion may correspond to central field of view. The first set of images may be superimposed over a view of the real world to create at least part of an interactive space. The first set of images may be focused at a focal distance away from the user.

The second image forming component 504 may be configured to generate light rays to form a second set of images of virtual content at a second resolution. The second resolution may be less than the first resolution. The second image forming component 504 may be configured such that when the headset is installed on the head of the user, the second set of images may be presented to the user over a second angular portion of the user's field-of-view. The second angular portion may correspond to peripheral field of view. The second set of images may be superimposed over a view of the real world to create at least part of the interactive space. The second set of images may be focused at a focal distance away from the user.

The first tuning component 506 may be positioned on a user-side of first image forming component 502 and second image forming component 504. The second tuning component 508 may be positioned on the environment-side of first image forming component 502 and second image forming component 504. The position of first tuning component 506 and/or second tuning component 508 with respect to first image forming component 502 and second image forming component 504 may mean first tuning component 506 and/or second tuning component 508 form optical paths with optical elements included in first image forming component 502 and second image forming component 504. A first optical path may include a path where light rays from an ambient environment 510 pass through second tuning component 508, then pass through an optical element of first image forming component 502 where they combine with light rays provided to the optical element via a light source (not shown). The combined light rays may pass through first tuning component 506 forming light rays 512 that encounter eye 516. A second optical path may include a path where light rays from ambient environment 510 pass through second tuning component 508, then pass through an optical element of second image forming component 504 where they combine with light rays provided to the optical element via a light source (not shown). The combined light rays may pass through first tuning component 506 forming light rays 514 that encounter eye 516. A mirrored configuration of the components shown in FIG. 5 may be used for a second eye of the user.

In some implementations, first tuning component 506 may comprise a negative tunable lens; and second tuning component 508 may comprise a positive tunable lens.

In some implementations, first tuning component 506 may comprise a polarizing tunable lens; and second tuning component 508 may comprise an absorptive polarizer.

Figure 6:
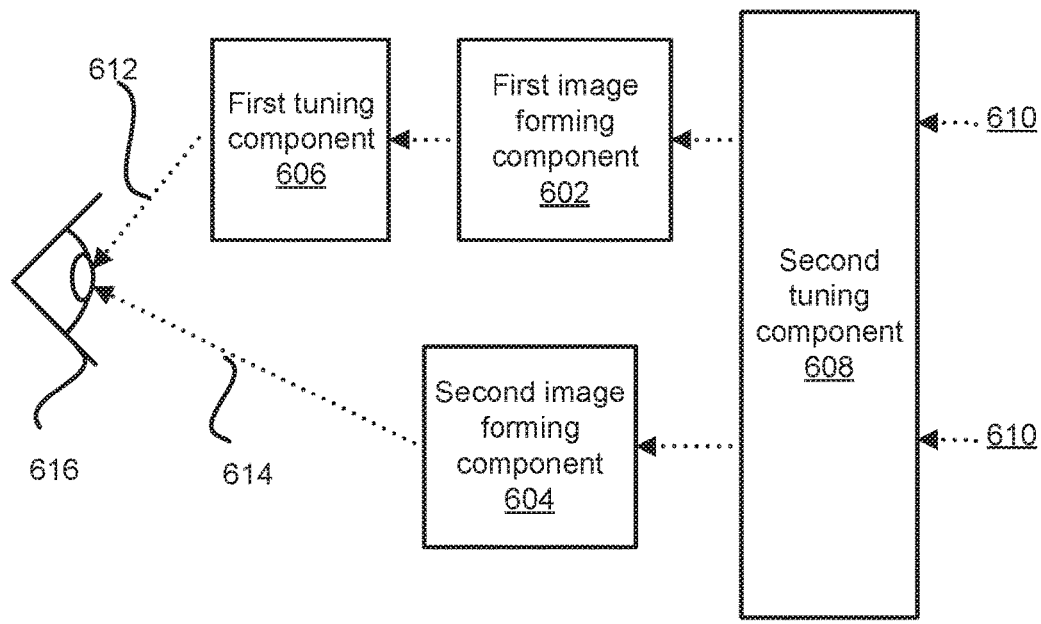
FIG. 6 illustrates a configuration of image forming components and tuning components, in accordance with one or more implementations.

FIG. 6 illustrates a configuration of image forming components and tuning components. The image forming components and tuning components may be held by a headset (not shown in FIG. 6). The image forming components may include one or more of a first image forming component 602, a second image forming component 604, and/or other image forming components. The tuning components may include one or more of a first tuning component 606, a second tuning component 608, and/or other tuning components.

The first image forming component 602 may be configured to generate light rays to form a first set of images of virtual content at a first resolution. The first image forming component 602 may be configured such that when the headset is installed on the head of the user, the first set of images may be presented to the user over a first angular portion of the user's field-of-view. The first angular portion may correspond to central field of view. The first set of images may be superimposed over a view of the real world to create at least part of an interactive space. The first set of images may be focused at a focal distance away from the user.

The second image forming component 604 may be configured to generate light rays to form a second set of images of virtual content at a second resolution. The second resolution may be less than the first resolution. The second image forming component 604 may be configured such that when the headset is installed on the head of the user, the second set of images may be presented to the user over a second angular portion of the user's field-of-view. The second angular portion may correspond to peripheral field of view. The second set of images may be superimposed over a view of the real world to create at least part of the interactive space. The second set of images may be focused at a focal distance away from the user.

The first tuning component 606 may be positioned on a user-side of first image forming component 602. The second tuning component 608 may be positioned on the environment-side of first image forming component 602 and second image forming component 604. The position of first tuning component 606 and/or second tuning component 608 with respect to first image forming component 602 and/or second image forming component 604 may mean first tuning component 606 and/or second tuning component 608 form optical paths with optical elements included in first image forming component 602 and second image forming component 604. A first optical path may include a path where light rays from an ambient environment 610 pass through second tuning component 608, then pass through an optical element of first image forming component 602 where they combine with light rays provided to the optical element via a light source (not shown). The combined light rays may pass through first tuning component 606 forming light rays 612 that encounter eye 616. A second optical path may include a path where light rays from ambient environment 610 pass through second tuning component 608, then pass through an optical element of second image forming component 604 where they combine with light rays provided to the optical element via a light source (not shown). The combined light rays 614 may then encounter eye 616. A mirrored configuration of the components shown in FIG. 6 may be used for a second eye of the user.

In some implementations, first tuning component 606 may comprise a polarizing tunable lens; and second tuning component 608 may comprise an absorptive polarizer.

Figure 7:
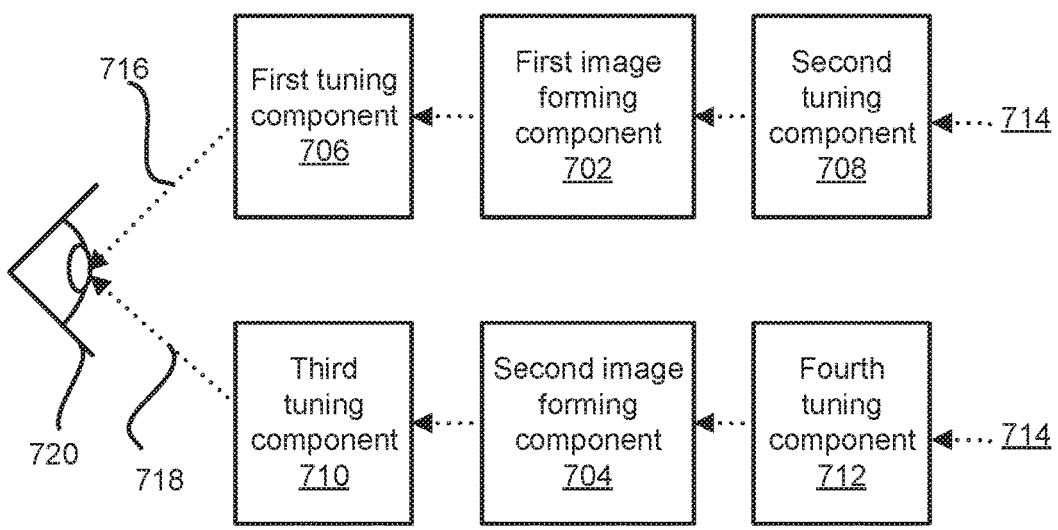
FIG. 7 illustrates a configuration of image forming components and tuning components, in accordance with one or more implementations.

FIG. 7 illustrates a configuration of image forming components and tuning components. The image forming components and tuning components may be held by a headset (not shown in FIG. 7). The image forming components may include one or more of a first image forming component 702, a second image forming component 704, and/or other image forming components. The tuning components may include one or more of a first tuning component 706, a second tuning component 708, a third tuning component 710, a fourth tuning component 712, and/or other tuning components.

The first image forming component 702 may be configured to generate light rays to form a first set of images of virtual content at a first resolution. The first image forming component 702 may be configured such that when the headset is installed on the head of the user, the first set of images may be presented to the user over a first angular portion of the user's field-of-view. The first angular portion may correspond to central field of view. The first set of images may be superimposed over a view of the real world to create at least part of an interactive space. The first set of images may be focused at a focal distance away from the user.

The second image forming component 704 may be configured to generate light rays to form a second set of images of virtual content at a second resolution. The second resolution may be less than the first resolution. The second image forming component 704 may be configured such that when the headset is installed on the head of the user, the second set of images may be presented to the user over a second angular portion of the user's field-of-view. The second angular portion may correspond to peripheral field of view. The second set of images may be superimposed over a view of the real world to create at least part of the interactive space. The second set of images may be focused at a focal distance away from the user.

The first tuning component 706 may be positioned on a user-side of first image forming component 702. The second tuning component 708 may be positioned on the environment-side of first image forming component 702. The position of first tuning component 706 and/or second tuning component 708 with respect to first image forming component 702 may mean first tuning component 706 and/or second tuning component 708 form an optical path with an optical element included in first image forming component 702. The optical path may include a path where light rays from an ambient environment 714 pass through second tuning component 708, then pass through an optical element of first image forming component 702 where they combine with light rays provided to the optical element via a light source (not shown). The combined light rays may pass through first tuning component 706 forming light rays 716 that encounter eye 720.

The third tuning component 710 may be positioned on a user-side of second image forming component 704. The fourth tuning component 712 may be positioned on the environment-side of second image forming component 704. The position of third tuning component 710 and/or fourth tuning component 712 with respect to second image forming component 704 may mean third tuning component 710 and/or fourth tuning component 712 form an optical path with an optical element included in second image forming component 704. The optical path may include a path where light rays from an ambient environment 714 pass through fourth tuning component 712, then pass through an optical element of second image forming component 704 where they combine with light rays provided to the optical element via a light source (not shown). The combined light rays may pass through third tuning component 710 forming light rays 718 that encounter eye 720. A mirrored configuration of the components shown in FIG. 7 may be used for a second eye of the user.

In some implementations, first tuning component 706 may comprise a negative tunable lens; and second tuning component 708 may comprise a positive tunable lens. In some implementations, first tuning component 706 may comprise a polarizing tunable lens; and second tuning component 708 may comprise an absorptive polarizer.

In some implementations, third tuning component 710 may comprise a negative tunable lens; and fourth tuning component 712 may comprise a positive tunable lens. In some implementations, third tuning component 710 may comprise a polarizing tunable lens; and fourth tuning component 712 may comprise an absorptive polarizer.

FIG. 8-13 show configurations of image forming components and tuning components and further showing the particular configurations of light sources and optical elements of the image forming components. For illustrative purposes, the components depicted in these figures are viewed from a top-down perspective, where the eye (e.g., reference numerals 822 in FIG. 8, 922 in FIG. 9, 1022 in FIG. 10, 1122 in FIG. 11, and 1222 FIG. 12) is a user's right eye. It is also noted that similar components shown may be used for the left eye of the user, with the components in a mirrored and/or other configuration.

Figure 8:
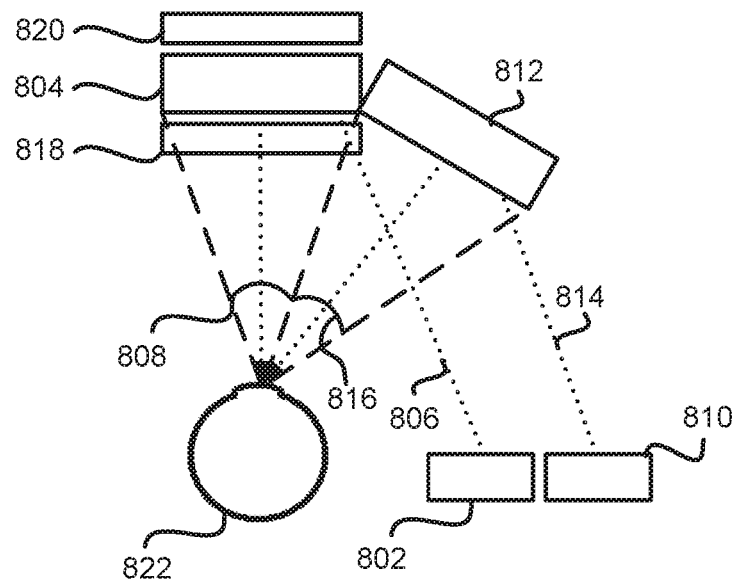
FIG. 8 illustrates a configuration of image forming components and tuning components, in accordance with one or more implementations.

FIG. 8 illustrates a configuration of image forming components and tuning components, similar to the configuration shown in FIG. 4. The image forming components and tuning components may be held by a headset (not shown in FIG. 8). The image forming components may include one or more of a first image forming component comprising a first light source 802 and a first optical element 804, a second image forming component comprising a second light source 810 and a second optical element 812, and/or other image forming components. The tuning components may include one or more of a first tuning component 818, a second tuning component 820, and/or other tuning components.

The first light source 802 of the first image forming component may be configured to generate light rays 806 to form a first set of images of virtual content at a first resolution. The first optical element 804 may be configured such that when the headset is installed on the head of the user, the first set of images may be presented to the user over a first angular portion 808 of the user's field-of-view. The first angular portion 808 may correspond to central field of view. The first angular portion 808 may be centered around the user's line of sight from eye 822

The second light source 810 of the second image forming component may be configured to generate light rays 814 to form a second set of images of virtual content at a second resolution. The second resolution may be less than the first resolution. The second optical element 812 may be configured such that when the headset is installed on the head of the user, the second set of images may be presented to the user over a second angular portion 816 of the user's field-of-view. The second angular portion 816 may correspond to peripheral field of view.

The first tuning component 818 may be positioned on a user-side of first optical element 804. The second tuning component 820 may be positioned on the environment-side of first optical element 804. An optical path may be formed which includes a path where light rays from an ambient environment pass through second tuning component 820, then pass through first optical element 804 where they combine with light rays 806 provided to first optical element 804 by first light source 802. The combined light rays may pass through first tuning component 818 forming light rays that encounter eye 822.

The second light source 810 may emit light rays 814 directed toward second optical element 812. The second optical element 812 may provide light rays 814 to eye 822.

Figure 9:
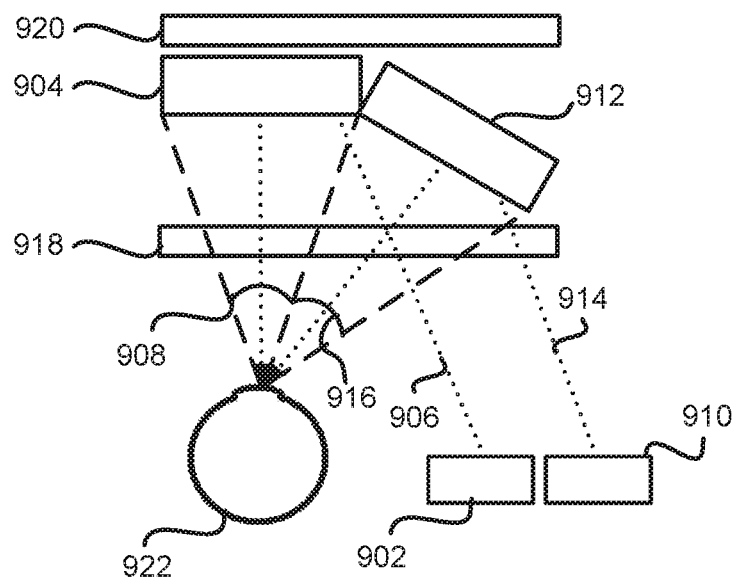
FIG. 9 illustrates a configuration of image forming components and tuning components, in accordance with one or more implementations.

FIG. 9 illustrates a configuration of image forming components and tuning components, similar to the configuration shown in FIG. 5. The image forming components and tuning components may be held by a headset (not shown in FIG. 9). The image forming components may include one or more of a first image forming component comprising a first light source 902 and a first optical element 904, a second image forming component comprising a second light source 910 and a second optical element 912, and/or other image forming components. The tuning components may include one or more of a first tuning component 918, a second tuning component 920, and/or other tuning components.

In some implementations, first tuning component 918 may comprise a negative tunable lens; and second tuning component 920 may comprise a positive tunable lens.

The first light source 902 may be configured to generate light rays 906 to form a first set of images of virtual content at a first resolution. The first optical element 904 may be configured such that when the headset is installed on the head of the user, the first set of images may be presented to the user over a first angular portion 908 of the user's field-of-view. The first angular portion 908 may correspond to central field of view. The first angular portion 908 may be centered around the user's line of sight from eye 922.

The second light source 910 may be configured to generate light rays 914 to form a second set of images of virtual content at a second resolution. The second resolution may be less than the first resolution. The second optical element 912 may be configured such that when the headset is installed on the head of the user, the second set of images may be presented to the user over a second angular portion 916 of the user's field-of-view. The second angular portion 916 may correspond to peripheral field of view.

The first tuning component 918 may be positioned on a user-side of first optical element 904 and second optical element 912. The second tuning component 920 may be positioned on the environment-side of first optical element 904 and second optical element 912. The position of first tuning component 918 and/or second tuning component 920 with respect to first optical element 904 and second optical element 912 may mean first tuning component 918 and/or second tuning component 920 form optical paths with first optical element 904 and second optical element 912. A first optical path may include a path where light rays from an ambient environment pass through second tuning component 920, then pass through first optical element 904 where they combine with light rays 906 provided to first optical element 904 via first light source 902. The combined light rays may pass through first tuning component 918 forming light rays that encounter eye 922. A second optical path may include a path where light rays from ambient environment pass through second tuning component 920, then pass through second optical element 912 where they combine with light rays 914 provided to second optical element 912 via second light source 910. The combined light rays may pass through first tuning component 918 forming light rays that encounter eye 922.

Figure 10:
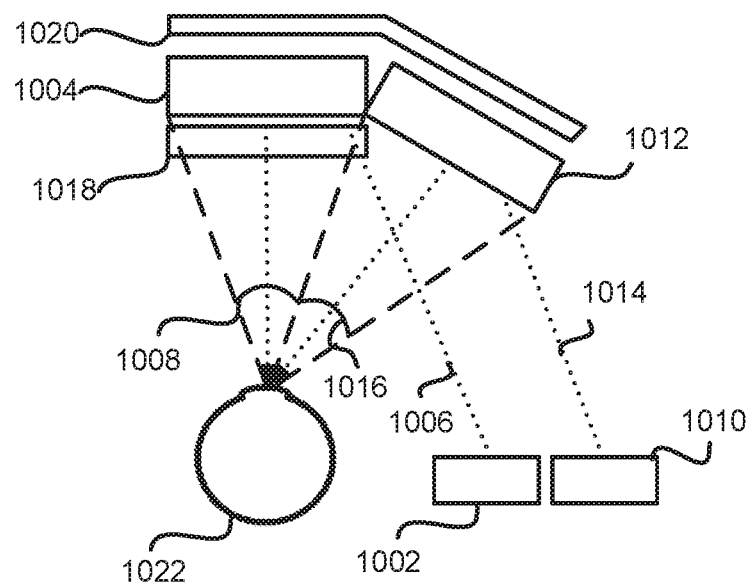
FIG. 10 a configuration of image forming components and tuning components, in accordance with one or more implementations.

FIG. 10 illustrates a configuration of image forming components and tuning components, similar to the configuration shown in FIG. 6. The image forming components and tuning components may be held by a headset (not shown in FIG. 10). The image forming components may include one or more of a first image forming component comprising a first light source 1002 and a first optical element 1004, a second image forming component comprising a second light source 1010 and a second optical element 1012, and/or other image forming components. The tuning components may include one or more of a first tuning component 1018, a second tuning component 1020, and/or other tuning components.

In some implementations, first tuning component 1018 may comprise a polarizing tunable lens; and second tuning component 1020 may comprise an absorptive polarizer.

The first light source 1002 may be configured to generate light rays 1006 to form a first set of images of virtual content at a first resolution. The first optical element 1004 may be configured such that when the headset is installed on the head of the user, the first set of images may be presented to the user over a first angular portion 1008 of the user's field-of-view. The first angular portion 1008 may correspond to central field of view. The first angular portion 1008 may be centered around the user's line of sight from eye 1022.

The second light source 1010 may be configured to generate light rays 1014 to form a second set of images of virtual content at a second resolution. The second resolution may be less than the first resolution. The second optical element 1012 may be configured such that when the headset is installed on the head of the user, the second set of images may be presented to the user over a second angular portion 1016 of the user's field-of-view. The second angular portion 1016 may correspond to peripheral field of view.

The first tuning component 1018 may be positioned on a user-side of first optical element 1004. The second tuning component 1020 may be positioned on the environment-side of first optical element 1004 and second optical element 1012. A first optical path may include a path where light rays from an ambient environment pass through second tuning component 1020, then pass through first optical element 1004 where they combine with light rays 1006 provided to first optical element 1004 via first light source 1002. The combined light rays may pass through first tuning component 1018 forming light rays that encounter eye 1022. A second optical path may include a path where light rays from ambient environment pass through second tuning component 1020, then pass through second optical element 1012 where they combine with light rays 1014 provided to second optical element 1012 via second light source 1010. The combined light rays may then encounter eye 1022.

Figure 11:
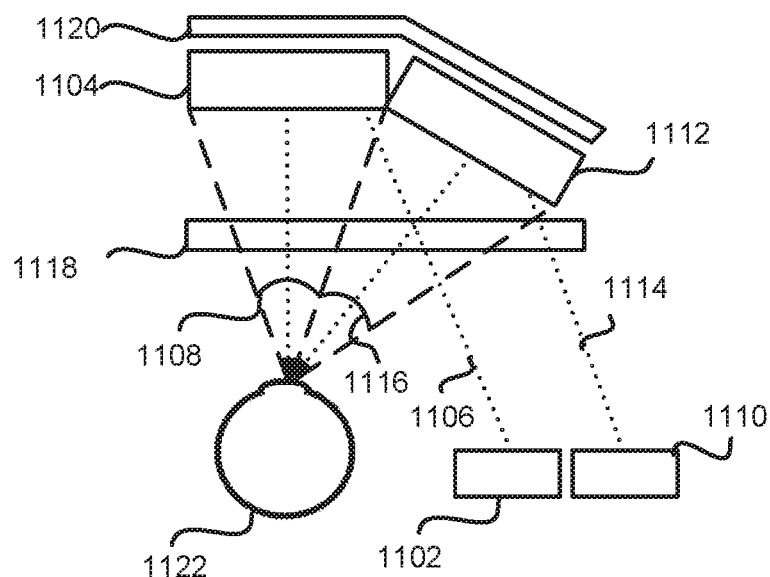
FIG. 11 illustrates a configuration of image forming components and tuning components, in accordance with one or more implementations.

FIG. 11 illustrates a configuration of image forming components and tuning components, similar to the configurations shown in FIG. 5 and/or FIG. 9. The image forming components and tuning components may be held by a headset (not shown in FIG. 11). The image forming components may include one or more of a first image forming component comprising a first light source 1102 and a first optical element 1104, a second image forming component comprising a second light source 1110 and a second optical element 1112, and/or other image forming components. The tuning components may include one or more of a first tuning component 1118, a second tuning component 1120, and/or other tuning components.

In some implementations, first tuning component 1118 may comprise a polarizing tunable lens; and second tuning component 1120 may comprise an absorptive polarizer. The absorptive polarizer of second tuning component 1120 may contour the shape of first optical element 1104, second optical element 1112, and/or a material on which first optical element 1104 and/or second optical element 1112 may be disposed thereon.

The first light source 1102 may be configured to generate light rays to form a first set of images of virtual content at a first resolution. The first optical element 1104 may be configured such that when the headset is installed on the head of the user, the first set of images may be presented to the user over a first angular portion 1108 of the user's field-of-view. The first angular portion 1108 may correspond to central field of view. The first angular portion 1108 may be centered around the user's line of sight from eye 1122.

The second light source 1110 may be configured to generate light rays to form a second set of images of virtual content at a second resolution. The second resolution may be less than the first resolution. The second optical element 1112 may be configured such that when the headset is installed on the head of the user, the second set of images may be presented to the user over a second angular portion 1116 of the user's field-of-view. The second angular portion 1116 may correspond to peripheral field of view.

The first tuning component 1118 may be positioned on a user-side of first optical element 1104 and second optical element 1112. The second tuning component 1120 may be positioned on the environment-side of first optical element 1104 and second optical element 1112. The position of first tuning component 1118 and/or second tuning component 1120 with respect to first optical element 1104 and second optical element 1112 may mean first tuning component 1118 and/or second tuning component 1120 form optical paths with first optical element 1104 and second optical element 1112. A first optical path may include a path where light rays from an ambient environment pass through second tuning component 1120, then pass through first optical element 1104 where they combine with light rays 1106 provided to first optical element 1104 via first light source 1102. The combined light rays may pass through first tuning component 1118 forming light rays that encounter eye 1122. A second optical path may include a path where light rays from ambient environment pass through second tuning component 1120, then pass through second optical element 1112 where they combine with light rays 1114 provided to second optical element 1112 via second light source 1110. The combined light rays may pass through first tuning component 1118 forming light rays that encounter eye 1122.

Figure 12:
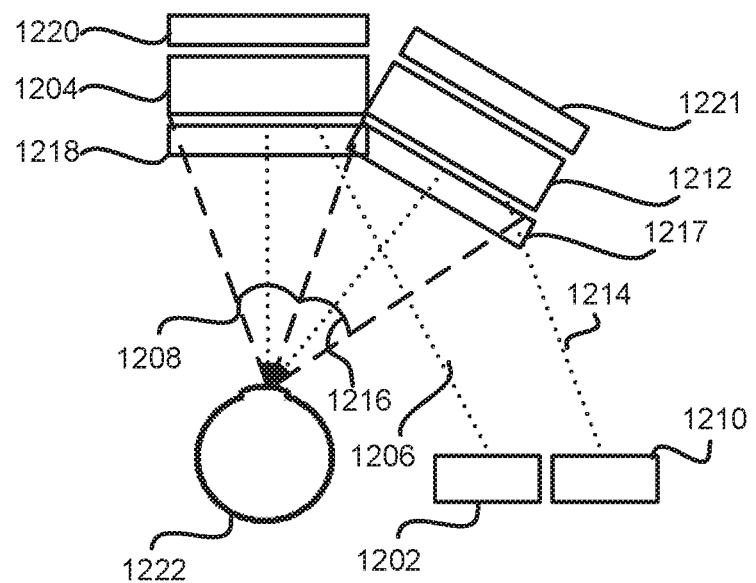
FIG. 12 illustrates a configuration of image forming components and tuning components, in accordance with one or more implementations.

FIG. 12 illustrates a configuration of image forming components and tuning components, similar to the configuration shown in FIG. 7. The image forming components and tuning components may be held by a headset (not shown in FIG. 12). The image forming components may include one or more of a first image forming component comprising a first light source 1202 and a first optical element 1204, a second image forming component comprising a second light source 1210 and a second optical element 1212, and/or other image forming components. The tuning components may include one or more of a first tuning component 1218, a second tuning component 1220, a third tuning component 1217, a fourth tuning component 1221, and/or other tuning components.

The first light source 1202 may be configured to generate light rays 1206 to form a first set of images of virtual content at a first resolution. The first optical element 1204 may be configured such that when the headset is installed on the head of the user, the first set of images may be presented to the user over a first angular portion 1208 of the user's field-of-view. The first angular portion 1208 may correspond to central field of view.

The second light source 1210 may be configured to generate light rays 1214 to form a second set of images of virtual content at a second resolution. The second resolution may be less than the first resolution. The second optical element 1212 may be configured such that when the headset is installed on the head of the user, the second set of images may be presented to the user over a second angular portion 1216 of the user's field-of-view. The second angular portion 1216 may correspond to peripheral field of view.

The first tuning component 1218 may be positioned on a user-side of first optical element 1204. The second tuning component 1220 may be positioned on the environment-side of first optical element 1204. An optical path may include a path where light rays from an ambient environment pass through second tuning component 1220, then pass through first optical element 1204 where they combine with light rays 1206 provided to first optical element 1204 via first light source 1202. The combined light rays may pass through first tuning component 1218 forming light rays that encounter eye 1222.

The third tuning component 1217 may be positioned on a user-side of second optical element 1212. The fourth tuning component 1221 may be positioned on the environment-side of second optical element 1212. An optical path may be formed that includes a path where light rays from an ambient environment pass through fourth tuning component 1221, then pass through second optical element 1212 where they combine with light rays 1214 provided to second optical element 1212 via second light source 1210. The combined light rays may pass through third tuning component 1217 forming light rays that encounter eye 1222.

Figure 13:
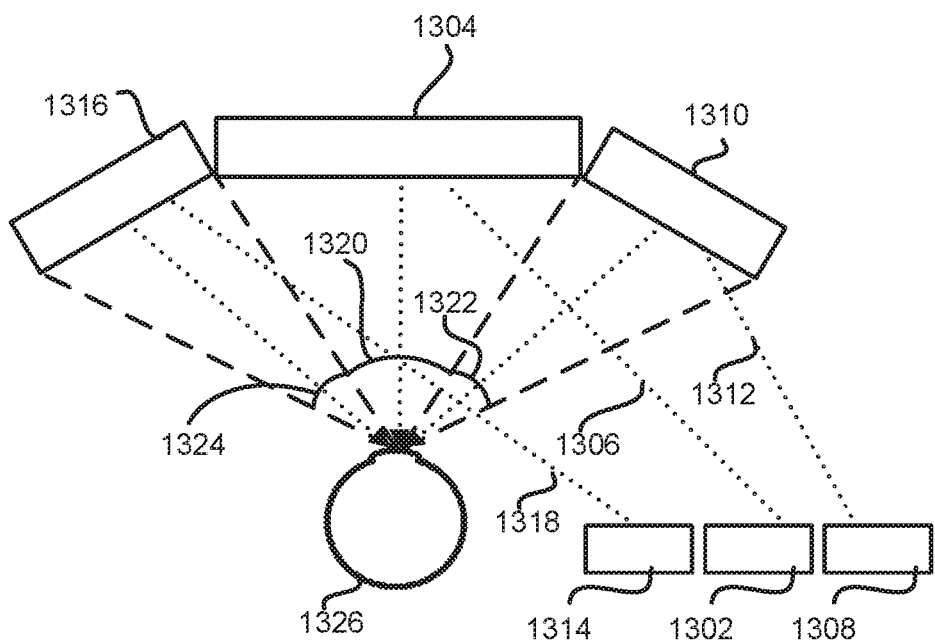
FIG. 13 illustrates a configuration of image forming components and tuning components, in accordance with one or more implementations.

FIG. 13 illustrates an exemplary configuration of three image forming components with respect to a user's eye 1326. A first image forming component may comprise one or more of a first light source 1302, a first optical element 1304, and/or other components. The first light source 1302 may be configured to generate light rays 1306 to form a first set of images of virtual content at a first resolution. The first optical element 1304 may be arranged on a headset (not shown in FIG. 13) such that when the headset is installed (e.g., worn) on the head of the user, the user's vision over a first angular portion 1320 of the user's field-of-view may be directed toward first optical element 1304. The first angular portion 1320 may comprise a 50 degree (or other range) portion of the user's monocular field-of-view from eye 1326. The first angular portion 1320 may be centered around the user's line of sight from eye 1326. The first optical element 1304 may be arranged on the headset such that light rays 1306 generated by first light source 1302 may be directed to first optical element 1304.

A second image forming component may comprise one or more of a second light source 1308, a second optical element 1310, and/or other components. The second light source 1308 may be configured to generate light rays 1312 to form a second set of images of virtual content at a second resolution. The second optical element 1310 may be arranged on the headset such that when the headset is installed on the head of the user, the user's vision over a second angular portion 1322 of the user's field-of-view may be directed toward second optical element 1310. The second angular portion 1322 may comprise a 20 degree (or other range) portion of the user's monocular field-of-view from eye 1326 extending from the first angular portion 1320. The second angular portion 1322 may be on the temporal side of the user's field-of-view from eye 1326. The second optical element 1310 may be arranged on the headset such that light rays 1312 generated by second light source 1308 may be directed towards second optical element 1310.

A third image forming component may comprise one or more of a third light source 1314, a third optical element 1316, and/or other components. The third light source 1314 may be configured to generate light rays 1318 to form a third set of images of virtual content at the second resolution. The third optical element 1316 may be arranged on the headset such that when the headset is installed on the head of the user, the user's vision over a third angular portion 1324 of the user's field-of-view may be directed toward third optical element 1316. The third angular portion 1324 may comprise a 20 degree (or other range) portion of the user's monocular field-of-view from eye 1326 adjacent to first angular portion 1320. The third angular portion 1324 may be on the nasal side of the user's field-of-view from eye 1326. The third optical element 1316 may be arranged on the headset such that light rays 1318 generated by third light source 914 may be directed toward third optical element 1316.

While FIG. 13 does not show tuning components, it is to be understood that an implementation of three (or more) image forming components may utilize one or more sets of tuning components as presented herein.

Returning to FIG. 1, one or more physical processors 104 may be configured by machine-readable instructions 106. Executing machine-readable instructions 106 may cause one or more physical processors 104 to facilitate providing an interactive space over an expanded field-of-view with focal distance tuning. The machine-readable instructions 106 may include one or more of a content component 108, a control component 110, a gaze tracking component 111, a depth sensing component 113, and/or other components.

In some implementations, content component 108 may be configured to determine virtual content to present to a user. Virtual content may include one or more virtual objects and/or other virtual content. Virtual content may be in the form of digital imagery generated by one or more image forming components 114.

In some implementations, control component 110 may be configured to control one or more of one or more image forming components 114, one or more tuning components 120, and/or other components. Controlling one or more image forming components 114 may include controlling light sources, optical elements, and/or other components.

One or more light sources may be controlled to generate light rays in accordance with virtual content to be presented to the user. One or more light sources may be controlled to generate light rays in accordance with intended resolutions of the images of virtual content to be presented to the user.

The virtual content may be perceived by the viewing user to lie within three-dimensional real space at a range that may be equal to a range of a focal plane within the viewing user's field-of-view, and/or other ranges. The range may be referred to herein as a "focal distance" of the focal plan. By way of non-limiting illustration, a light source may generate light rays to form a digital image, which when directed into a user's eyes, may be perceived as virtual content in three-dimensional space at a focal distance from the user's eye.

In some implementations, gaze tracking component 111 may be configured to determine gaze information, and/or other information. Gaze information may include one or more of a user's gaze direction, vergence distance, vergence angle, and/or other information. Gaze information may be determined over time. In some implementation, gaze information may be determined from output signals from one or more sensors of gaze tracking device 115, and/or other information. The output signals may convey one or more of positions of one or more pupils of a user relative to a locus of a reflectance of light emitted by an emitter of gaze tracking device 115, and/or other information used to determine gaze information. In some implementations, gaze direction may be expressed as a vector within a three-dimensional coordinate system. In some implementations, vergence distance may be expressed as one or more of a coordinate within the three-dimensional coordinate system, a range from a user, and/or other information.

In some implementations, control component 110 may be configured to control individual tuning components and/or sets of tuning components in response to one or more of gaze information determined by gaze tracking component 111, depth information determined by depth sensing component 113, and/or other information. For example, based on gaze tracking component 111 determining vergence distance for the user's gaze, control component 110 may be configured to control individual tuning components and/or sets of tuning components to adjust (e.g., tune) the focal distance of images forming virtual content. For example, based on one or more of determining the fixed focal distance associated with images formed by one or more image forming components 114, determining a vergence distance via gaze tracking component 111, and/or determining that the focal distance may be different from the vergence distance, control component 110 may be configured to control individual tuning components and/or sets of tuning components by adjusting the optical power of individual tuning components and/or sets of tuning components to adjust (e.g., tune) the focal distance to match, or substantially match, the vergence distance.

In some implementations, depth sensing component 113 may be used to determine a distance at which a user's hand(s) may be reaching out to interact with a virtual object that may be driving visual attention. The focal plane of the virtual object may be tuned through the tunable lenses, to match this measured distance so as to mitigate the effect of vergence-accommodation conflict. By way of non-limiting illustration, the tunable focal distance may be driven by depth sensor 121 measuring the location at which hands are interacting with virtual content. The virtual content may have a certain rendered distance, and by virtue of the fact that the hands may be reaching for that specific content, this may provide a point of attention for the visual system. The focal distance may be driven to the distance of the point. In some implementations, the information determined by depth sensing component 113 may be referred to as "depth information."

In some implementations, a tunable lens (e.g., positive tunable lens, negative tunable lens, and/or a polarizing tunable lens) may be controlled to change a focal length of the lens. In some implementations, increasing the focal length of a lens (e.g., decreasing its optical power) may cause the range of a focal distance within a perceived three-dimensional light field to increase. In some implementations, decreasing the focal length of lens (e.g., increasing the optical power) may cause the range of a focal distance within a perceived three-dimensional light field to decrease.

In some implementations, one or more of processor(s) 104, one or more image forming components 114, one or more tuning component 120, gaze tracking device 115, external resources 116, depth sensor 121, and/or other components may be operatively linked via one or more electronic communication links. For example, such electronic communication links may be established, at least in part, via network(s) 118. Network(s) 118 may comprise one or both of wired or wireless communications. It will be appreciated that this is not intended to be limiting and that the scope of this disclosure includes implementations in which processor(s) 104, one or more image forming components 114, one or more tuning component 120, gaze tracking device 115, external resources 116, and/or other components may be operatively linked via some other communication media.

The external resources 116 may include sources of information, hosts, external entities participating with system 100, providers of virtual content, and/or other resources. In some implementations, some or all of the functionality attributed herein to external resources 116 may be provided by resources included in system 100.

The processor(s) 104 may include and/or have access to electronic storage 112, and/or other components. The processor(s) 104 may include communication lines or ports to enable the exchange of information with a network and/or other components of system 100. Illustration of processor(s) 104 in FIG. 1 is not intended to be limiting. The processor(s) 104 may include a plurality of hardware, software, and/or firmware components operating together to provide the functionality attributed herein to processor(s) 104. For example, processor(s) 104 may be implemented by a cloud of computing platforms operating together as processor(s) 104.

Electronic storage 112 may comprise non-transitory electronic storage media that electronically stores information. The electronic storage media of electronic storage 112 may include one or both of system storage that is provided integrally (i.e., substantially non-removable) with processor(s) 104 and/or removable storage that is removably connectable to processor(s) 104 via, for example, a port or a drive. A port may include a USB port, a firewire port, and/or other port. A drive may include a disk drive and/or other drive. Electronic storage 112 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 112 may include one or more virtual storage resources (e.g., cloud storage, a virtual private network, and/or other virtual storage resources). Electronic storage 112 may store software algorithms, information determined by processor(s) 104, information received from other components of system 100, and/or other information that enables processor(s) 104 to function as described herein.

Processor(s) 104 is configured to provide information-processing capabilities. As such, processor(s) 104 may include one or more of a physical processor, a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor 104 may be configured to execute components 108, 110, 111, and/or other components. Processor(s) 104 may be configured to execute component 108, 110, 111, and/or other components by software; hardware; firmware; some combination of software, hardware, and/or firmware; and/or other mechanisms for configuring processing capabilities on processor(s) 104.

It should be appreciated that although components 108, 110, and 111 are illustrated in FIG. 1 as being co-located within a single processing unit, in implementations in which processor(s) 104 includes multiple processing units, one or more of components may be located remotely from the other components. The description of the functionality provided by an individual component is for illustrative purposes and is not intended to be limiting, as a given component may provide more or less functionality than is described. For example, a given component may be eliminated, and some or all of its functionality may be provided by another component. As another example, processor(s) 104 may be configured to execute one or more additional components that may perform some or all of the functionality attributed to individual ones of components 108, 110, 111, and/or other components.

Figure 15:
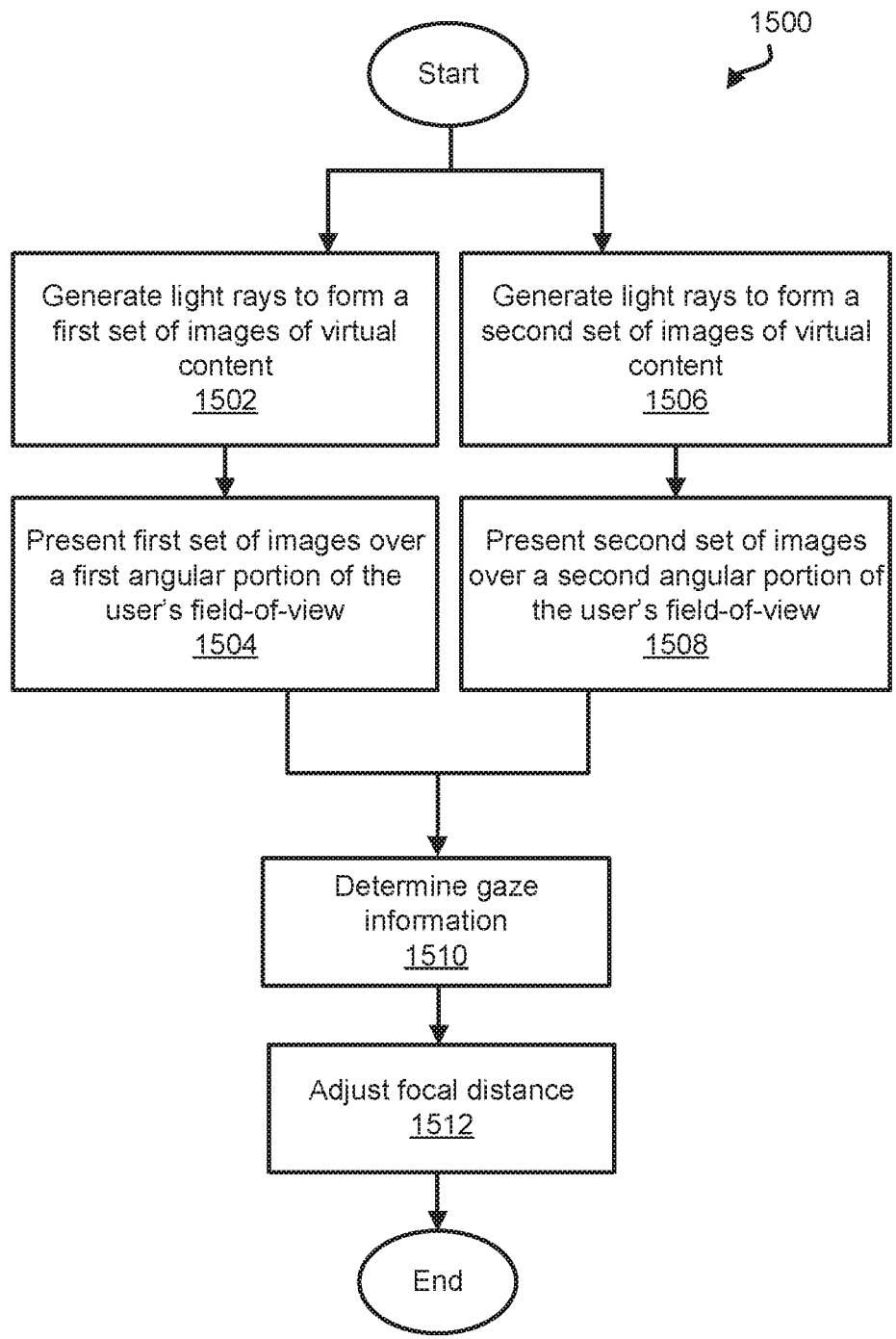
FIG. 15 illustrates a method to provide an interactive space over an expanded field-of-view with focal distance tuning, in accordance with one or more implementations.

FIG. 15 illustrates a method 1500 to provide an interactive space over an expanded field-of-view with focal distance tuning, in accordance with one or more implementations. The operations of method 1500 presented below are intended to be illustrative. In some implementations, method 1500 may be accomplished with one or more additional operations not described, and/or without one or more of the operations discussed. Additionally, the order in which the operations of method 1500 are illustrated in FIG. 15 and described below is not intended to be limiting. For example, in some implementations, operations 1502 and 1504 may be carried out in parallel with operations 1506 and 1508.

In some implementations, method 1500 may be implemented in and/or using a system, such as system 100 shown in FIG. 1 and described herein. In particular, method 1500 may be implemented using a headset configured to be installed on a head of a user, such as headset 102 shown in FIG. 1 and described herein. The headset may comprise one or more of one or more physical processors, one or more image forming components, one or more tuning components, a gaze tracking device, and/or other components. The one or more physical processors may include one or more devices executing one or more of the operations of method 1500 in response to instructions stored electronically on electronic storage media. The one or more processing devices may include one or more devices configured through hardware, firmware, and/or software to be specifically designed for execution of one or more of the operations of method 1500.

At an operation 1502, light rays may be generated to form a first set of images of virtual content at a first resolution. In some implementations, operation 1502 may be performed using one or more of a first image forming component the same as or similar to an individual one of one or more image forming components 114, one or more physical processors executing a control component the same as or similar to control component 110, and/or other components (shown in FIG. 1 and described herein).

At an operation 1504, the first set of images of virtual content may be presented to the user over a first angular portion of the user's field-of-view. The first set of images of virtual content may be superimposed over a view of the real world to create at least part of an interactive space. In some implementations, operation 1504 may be performed using one or more of the first image forming component and/or other image forming components, one or more physical processors executing a control component the same as or similar to control component 110, and/or other components (shown in FIG. 1 and described herein).

At an operation 1506, light rays may be generated to form a second set of images of virtual content at a second resolution. The second resolution may be different from the first resolution. In some implementations, operation 1506 may be performed using one or more of a second image forming component that is the same as or similar to an individual one of one or more image forming components 114, one or more physical processors executing a control component the same as or similar to control component 110, and/or other components (shown in FIG. 1 and described herein).

At an operation 1508, the second set of images may be presented to the user over a second angular portion of the user's field-of-view. The second angular portion may be different from the first angular portion. The second set of images of virtual content may be superimposed over the view of the real world to create at least part of the interactive space. In some implementations, operation 1508 may be performed using one or more of the second image forming component, one or more physical processors executing a control component the same as or similar to control component 110, and/or other components (shown in FIG. 1 and described herein).

At an operation 1510, gaze information and/or depth information may be determined. Gaze information may include one or more of a gaze direction, a vergence distance, a vergence angle, and/or other information. In some implementations, operation 1502 may be performed using one or more of a gaze tracking device the same as or similar to gaze tracking device 115, a depth sensor the same as or similar to depth sensor 121, one or more physical processors executing a gaze tracking component the same as or similar to gaze tracking component 111, one or more physical processors executing a depth sensing component the same as or similar to depth sensing component 113, and/or other components (shown in FIG. 1 and described herein).

At an operation 1512, the focal distance of images presented to the user may be adjusted based on the gaze information. By way of non-limiting illustration, the focal distance may be adjusted to be the same, or similar to, the vergence distance included in the gaze information. In some implementations, operation 1502 may be performed using one or more of a set of tuning component such as one or more tuning component 120, one or more physical processors executing a control component the same as or similar to control component 110, and/or other components (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured to provide an interactive space over an expanded field-of-view with focal distance tuning, the system comprising:

a headset configured to be installed on a head of a user;

a first image forming component held by the headset configured to generate light rays to form a first set of images of virtual content at a first resolution, the first image forming component being configured such that (i) when the headset is installed on the head of the user, the first set of images is presented to an eye of the user over a first angular portion of the user's monocular field-of-view from the eye, (ii) the first set of images is superimposed over a view of the real world to create at least part of the interactive space, and (iii) the first set of images is focused at a focal distance away from the user;

a second image forming component held by the headset configured to generate light rays to form a second set of images of virtual content at a second resolution, the second image forming component being configured such that (i) when the headset is installed on the head of the user, the second set of images is presented to the eye of the user over a second angular portion of the user's monocular field-of-view, the second angular portion being different from the first angular portion from the eye, (ii) the second set of images is superimposed over the view of the real world to create at least a second part of the interactive space, and (iii) the second set of images is focused at the focal distance away from the user;

a third image forming component held by the headset configured to generate light rays to form a third set of images of virtual content, the second image forming component being configured such that (i) when the headset is installed on the head of the user, the third set of images of virtual content is presented to a second eye of the user over a third angular portion of the user's monocular field-of-view from the second eye, and (ii) the third set of images of virtual content is superimposed over the view of the real world to create at least a third part of the interactive space;

a fourth image forming component held by the headset configured to generate light rays to form a fourth set of images of virtual content, the fourth image forming component being configured such that (i) when the headset is installed on the head of the user, the fourth set of images of virtual content is presented to the second eye of the user over a fourth angular portion of the user's monocular field-of-view from the second eye, and (ii) the fourth set of images of virtual content is superimposed over the view of the real world to create at least a fourth part of the interactive space;

a gaze tracking device held by the headset configured to generate output signals conveying positions of one or more pupils of the user;

a set of tuning component held by the headset configured to adjust the focal distance; and one or more physical processors configured by machine-readable instructions to:

control the first image forming component to generate the light rays to form the first set of images of virtual content;

control the second image forming component to generate the light rays to form the second set of images of virtual content;

control the third image forming component to generate the light rays to form the third set of images of virtual content;

control the fourth image forming component to generate the light rays to form the fourth set of images of virtual content;

determine a vergence distance of a gaze of the user over time based on the output signals of the gaze tracking device; and control the set of tuning component to adjust the focal distance to match a current vergence distance of the gaze of the user.

2. The system of claim 1, wherein the set of tuning component includes at least one positive tunable lens and at least one negative tunable lens.

3. The system of claim 2, wherein a first positive tunable lens and a first negative tunable lens are implemented with the first image forming component.

4. The system of claim 3, wherein the one or more physical processors are further configured by machine-readable instructions such that controlling the set of tuning component to adjust the focal distance comprises:

controlling one or both of the first positive tunable lens or the first negative tunable lens to either decrease of increase optical power of respective ones of the first positive tunable lens and the first negative tunable lens, wherein decreasing optical power causes the focal distance to increase, and increasing optical power causes the focal distance to decrease.

5. The system of claim 1, wherein the set of tuning components includes at least one absorptive polarizer and at least one polarizing tunable lens.

6. The system of claim 5, wherein a first absorptive polarizer and a first polarizing tunable lens are implemented with the first image forming component.

7. The system of claim 6, wherein the one or more physical processors are further configured by machine-readable instructions such that controlling the set of tuning components to adjust the focal distance comprises:

controlling the first polarizing tunable lens to either decrease or increase an optical power of the first polarizing tunable lens, wherein decreasing the optical power causes the focal distance to increase, and increasing the optical power causes the focal distance to decrease.

8. The system of claim 1, wherein the first resolution is higher than the second resolution.

9. The system of claim 1, wherein the first angular portion does not overlap with the second angular portion.

10. A method to provide an interactive space over an expanded field-of-view with focal distance tuning, the method being implemented in a system comprising a first image forming component held by a headset, a second image forming component held by the headset, a third image forming component held by the headset, and a fourth image forming component held by the headset, one or more physical processors, a set of tuning components held by the headset, a gaze tracking device held by the headset, and storage media storing machine-readable instructions, the method comprising:

generating, by the first image forming component, light rays to form a first set of images of virtual content at a first resolution;

presenting, by the first image forming component, the first set of images to an eye of the user over a first angular portion of the user's monocular field-of-view from the eye, the first set of images being superimposed over a view of the real world to create at least part of the interactive space, the first set of images being focused at a focal distance away from the user;

generating, by the second image forming component, light rays to form a second set of images of virtual content at a second resolution;

presenting, by the second image forming component, the second set of images to the eye of the user over a second angular portion of the user's monocular field-of-view from the eye, the second angular portion being different from the first angular portion, the second set of images being superimposed over the view of the real world to create at least part of the interactive space, the second set of images being focused at the focal distance away from the user;

generating, by the third image forming component, light rays to form a third set of images of virtual content;

presenting, by the third image forming component, the third set of images to a second eye of the user over a third angular portion of the user's monocular field-of-view from the second eye, the third set of images of virtual content being superimposed over the view of the real world to create at least a third part of the interactive space;

generating, by the fourth image forming component, light rays to form a fourth set of images of virtual content; and presenting, by the fourth image forming component, the fourth set of images to the second eye of the user over a fourth angular portion of the user's monocular field-of-view from the second eye, the fourth set of images of virtual content being superimposed over the view of the real world to create at least a fourth part of the interactive space;

determining, by the one or more physical processors, a vergence distance of a gaze of the user over time based on output signals of the gaze tracking device; and adjusting, by the set of tuning components, the focal distance to match a current vergence distance of the gaze of the user.

11. The method of claim 10, wherein the set of tuning components includes at least one positive tunable lens and at least one negative tunable lens.

12. The method of claim 11, wherein a first positive tunable lens and a first negative tunable lens are implemented with the first image forming component.

13. The method of claim 12, wherein adjusting, by the set of tuning components, the focal distance to match the current vergence distance of the gaze of the user comprises one or both of:

decreasing optical power of respective ones of the first positive tunable lens and the first negative tunable lens; or increasing the optical power of respective ones of the first positive tunable lens and the first negative tunable lens; and wherein decreasing optical power causes the focal distance to increase, and increasing optical power causes the focal distance to decrease.

14. The method of claim 10, wherein the set of tuning components includes at least one absorptive polarizer and at least one polarizing tunable lens.

15. The method of claim 14, wherein a first absorptive polarizer and a first polarizing tunable lens are implemented with the first image forming component.

16. The method of claim 15, wherein adjusting, by the set of tuning components, the focal distance to match the current vergence distance of the gaze of the user comprises one or both of:

decreasing optical power of the first polarizing tunable lens; or increasing the optical power of the first polarizing tunable lens; and wherein decreasing optical power causes the focal distance to increase, and increasing optical power causes the focal distance to decrease.

17. The method of claim 10, wherein the first resolution is higher than the second resolution.

18. The method of claim 10, wherein the first angular portion does not overlap with the second angular portion.

* * * * *